United States Patent
Jiang et al.

(10) Patent No.: US 7,288,611 B2
(45) Date of Patent: Oct. 30, 2007

(54) METHODS FOR PREPARING A RARE-EARTH CIS-1,4-POLYBUTADIENE RUBBER WITH A CONTROLLED MOLECULAR WEIGHT DISTRIBUTION

(75) Inventors: Liansheng Jiang, Changchun (CN); Xuequan Zhang, Changchun (CN); Weimin Dong, Changchun (CN); Xichun Liu, Changchun (CN); Jifu Bi, Changchun (CN)

(73) Assignee: Changchun Institute of Applied Chemistry Chinese Academy of Sciences, Changchun (CN)

( * ) Notice: Subject to any disclaimer, the term of this patent is extended or adjusted under 35 U.S.C. 154(b) by 166 days.

(21) Appl. No.: 10/949,250

(22) Filed: Sep. 27, 2004

(65) Prior Publication Data

US 2005/0113544 A1 May 26, 2005

(30) Foreign Application Priority Data

Sep. 25, 2003 (CN) ................................. 03 1 27180

(51) Int. Cl.
*C08F 4/52* (2006.01)
*C08F 36/06* (2006.01)

(52) U.S. Cl. ........................ 526/144; 526/128; 526/153; 526/164; 526/340.4; 502/107; 502/108; 502/117; 502/128; 502/132

(58) Field of Classification Search ................ 526/128, 526/144, 153, 164, 340.4; 502/107, 108, 502/117, 128, 132

See application file for complete search history.

(56) References Cited

U.S. PATENT DOCUMENTS 4,444,903 A * 4/1984 Carbonaro et al. ......... 502/102
5,502,126 A * 3/1996 Bell et al. ................... 526/142
6,391,990 B1 * 5/2002 Ishino et al. ................ 526/143
2004/0102589 A1 * 5/2004 Jang et al. .................. 526/134
2004/0147694 A1 * 7/2004 Sone et al. .................. 526/164
2005/0038215 A1 * 2/2005 Luo et al. .................... 526/335

FOREIGN PATENT DOCUMENTS

| CN | 1347923 | 5/2002 |
| JP | HEI 3-185008 | 8/1991 |
| JP | HEI 4-142308 | 5/1992 |

OTHER PUBLICATIONS

Hawley's Condensed Chemical Dictionary, 14th ed., John Wiley & Sons Inc., 2002.*
Copy of English language translation of Chinese Patent No. CN 1347923A; publication date: May 8, 2002.*
English Derwent Abstract of CN 1347923.
English Derwent Abstract of JP Hei 3-185008.
English Derwent Abstract of JP Hei 4-142308.

* cited by examiner

*Primary Examiner*—Fred Teskin
(74) *Attorney, Agent, or Firm*—Finnegan Henderson Farabow Garrett & Dunner, L.L.P.

(57) ABSTRACT

Disclosed herein are a method for preparing a cis-1,4-polybutadiene with a controlled molecular weight distribution, comprising polymerizing butadiene monomers using a rare-earth catalyst system comprising:
(a) at least one aliphatic hydrocarbon-soluble organometallic compound comprising at least one metal element chosen from the elements of atomic numbers 51-71 in the periodic table;
(b) at least one organoaluminum compound of the formula: $AlR^1R^2_2$,
(c) at least one aliphatic hydrocarbon-soluble halogen-containing compound;
(d) optionally at least one alkylaluminum alkoxide; and
(e) at least one conjugated double bond-containing organic compound, and methods of preparing the rare-earth catalyst system.

26 Claims, No Drawings

METHODS FOR PREPARING A RARE-EARTH CIS-1,4-POLYBUTADIENE RUBBER WITH A CONTROLLED MOLECULAR WEIGHT DISTRIBUTION

This disclosure relates to methods for preparing a rare-earth cis-1,4-polybutadiene rubber with a controlled molecular weight distribution. Specifically, disclosed herein are methods for preparing a cis-1,4-polybutadiene rubber with a controlled molecular weight distribution using a rare-earth catalyst system. Further disclosed herein is a method for preparing the rare-earth catalyst system.

The term "rare-earth cis-1,4-polybutadiene rubber" as used herein means a cis-1,4-polybutadiene rubber prepared using a rare-earth catalyst system.

The rare-earth catalyst system comprising a rare-earth carboxylate, an alkylaluminum and a chlorine-containing compound soluble in aliphatic hydrocarbons has been used in the industry. In manufacturing, this rare-earth catalyst system can be fed into a reactor by two different orders: (1) each catalyst component is fed separately; and (2) the catalyst components are premixed and aged before the feeding. Premixing and aging the catalyst components before the feeding can, for example, enhance the catalytic activity, reduce the catalyst amount used, and/or regulate the molecular weight distribution of the resulting polymer. Several factors can affect the molecular weight distribution of the resulting polymer, such as the feeding order and the mixing ratio of the catalyst components, and aging temperature and time.

On the other hand, it is believed that no matter which one of the two feeding orders is used, two kinds of active species can be produced in this three-component rare-earth catalyst system: One species is the homogeneous catalyst, i.e., homogeneous to naked eyes by visual observation; the other species is white colloidal catalyst visually observable and insoluble in aliphatic hydrocarbons. Depending on various factors such as the feeding order, temperature and time, the concentration of these two kinds of active species in the system can be different, and the polymerization speed of these two kinds of active species and the molecular weights of the resulting polymers may also be different.

For example, when this three-component rare-earth catalyst system is used in polymerizing butadiene monomers, a bimodal cis-1,4-polybutadiene rubber having a broad molecular weight distribution can be obtained. The broad molecular weight distribution can improve the processing properties and physical and mechanical properties of the resulting rare-earth cis-1,4-polybutadiene rubber. But if the molecular weight distribution is too broad, the resulting rare-earth cis-1,4-polybutadiene rubber may not be able to be used to strengthen and modify plastics and can deteriorate the extrusion property of mixed rubbers and the dynamic properties of the resulting products when it is used to make tires or other rubber products.

In addition, when the cis-1,4-polybutadiene rubber is manufactured in a solution polymerization process, a broad molecular weight distribution can lead to a high viscosity causing difficulties in heat transferring, delivering, spraying, and agglomerating. Moreover, as the monomer concentration cannot be high, the production capacity can be decreased while the energy-consumption and the production cost can increase.

In order to produce a rare-earth cis-1,4-polybutadiene rubber having a suitable molecular weight distribution, many efforts have been made. For example, Enichem Elastomers Ltd. Co. (Italy) discloses a process for preparing a catalyst system, wherein t-BuCl is used as a chloride-containing component of the catalyst and the catalyst components are fed in an order of (a rare-earth carboxylate+an alkylaluminum)+t-BuCl and the catalyst system is aged at a lower temperature (−30° C.) so that the resulting catalyst system can be maintained in a homogeneous state (Ep=375.421). However, the resulting cis-1,4-polybutadiene has a relatively narrow molecular weight distribution of 3-4 and a monomodal distribution flow-out curve is obtained.

In addition, several Japanese Patent Applications have also disclosed processes for preparing a rare-earth cis-1,4-polybutadiene rubber with a narrow molecular weight distribution. For example, document JP Hei 3-185008 discloses a process for preparing a polymer with a narrow molecular weight distribution of 1.5-1.8, a Mooney viscosity of 29-35, and a yield of 94.4%-95.1% by weight of cis-1,4-polybutadiene in the final product using a rare-earth catalyst system comprising a compound of the following formula as the ligand:

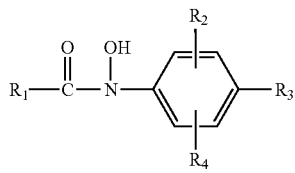

Japanese Patent Application No. Hei 4-142308 also discloses a process for preparing a polymer having a molecular weight distribution of 2.1-2.8, a Mooney viscosity of 24-33 and a yield of 97% by weight of cis-1,4-polybutadiene in the final product using a rare-earth catalyst system comprising a rare-earth halide comprising two mixed ligands of hydrophosphate esters and carboxylic acids.

Chinese Patent Application No. CN 1347923 discloses the effects of aging, mixing ratio, temperature and time on the phase state of the resulting catalyst system. Whether the three-component rare-earth catalyst system can be in a homogeneous state may depend on various factors, such as the feeding order, temperature, time and the mixing ratio of catalyst components. When the aging temperature rises and the time prolongs, the catalyst system may gradually become heterogeneous. In contrast, a green or reddish brown, stable, homogeneous catalyst system can be obtained by aging (a rare-earth carboxylate+an alkylaluminum)+a chlorine-containing compound, and adding a small amount of conjugated diolefin. By using this catalyst system, a high yield of cis-1,4-rare earth polybutadiene with a relatively narrow molecular weight distribution of 2-3 can be obtained.

Due to the quasi-living polymerization nature of the rare-earth catalyst system, the molecular weight of the resulting polymer is related to the conversion. In addition, since the alkylaluminum also serves as a chain transfer agent for the polymerization system, it may be difficult to produce a polymer with a narrower molecular weight distribution. A polymer with a molecular weight distribution of less than 2 has been obtained in the aforesaid disclosures, but the low Mooney viscosity (i.e., low molecular weight) has affected the mechanical properties of the polymer.

To overcome at least one of the above-mentioned problems, the present inventors have surprisingly found that by adding at least one alkylaluminum alkoxide and at least one conjugated double bond-containing organic compound and/or by using a catalyst system obtained by a specific catalyst-preparation method, a cis-1,4-polybutadiene rubber with a controllable molecular weight and a molecular weight distribution of equal to and less than 3 can be obtained.

Therefore, disclosed herein is a method for preparing a cis-1,4-polybutadiene rubber with a controlled molecular weight distribution, comprising polymerizing butadiene monomer using a rare-earth catalyst system comprising:

(a). at least one aliphatic hydrocarbon-soluble organometallic compound comprising at least one metal element chosen from the elements of atomic numbers 51-71 in the periodic table;

(b). at least one organoaluminum compound of the formula: $AlR^1R^2_2$, wherein $R^1$ and two $R^2$ groups, which may be identical or different, are each chosen from alkyl groups, or when $R^1$ is H, two $R^2$ groups are the same and chosen from alkyl groups;

(c). at least one aliphatic hydrocarbon-soluble halogen-containing compound chosen from metal haloalkyl compounds, metal halides, and haloalkyl compounds;

(d). optionally at least one alkylaluminum alkoxide; and (e). at least one conjugated double bond-containing organic compound.

The invention will now be described with reference to detailed embodiments of this disclosure. The following detailed description of the invention is illustrative and explanatory only, and it is not intended to limit the scope of the invention as claimed.

The at least one aliphatic hydrocarbon-soluble organometallic compound can be chosen, for example, from carboxylates and complexes of at least one metal element chosen from the elements of atomic numbers 51-71 in the periodic table, such as Nd and Pr. In one embodiment, the at least one aliphatic hydrocarbon-soluble organometallic compound is chosen from neodymium neodecanoate and neodymium naphthenate.

As used herein, the term "alkyl group" may be chosen, for example, from linear and branched $C_1$-$C_{20}$ alkyl groups, such as linear and branched $C_1$-$C_{10}$ alkyl groups, and further such as linear and branched $C_1$-$C_6$ alkyl groups.

For example, in the at least one organoaluminum compound, the alkyl group is chosen from $C_1$-$C_{20}$ linear and branched alkyl groups. In one embodiment, the at least one organoaluminum compound is chosen from triisobutylaluminum ($Al(i-Bu)_3$), triethylaluminum ($AlEt_3$), and diisobutylaluminum hydride ($AlH(i-Bu)_2$).

The at least one aliphatic hydrocarbon-soluble halogen-containing compound is chosen, for example, from haloalkanes, haloalkylaluminums and halosilanes. Among the aliphatic hydrocarbon-soluble halogen-containing compounds, mention may be made, for example, of t-butyl chloride (t-BuCl), alkylaluminum sesquichlorides of formula $Al_2R_3Cl_3$, monochlorodialkylaluminum of formula $AlR_2Cl$, wherein R is chosen from linear and branched $C_1$-$C_{20}$ alkyl groups, such as ethyl and isobutyl groups, and methyl chlorosilanes of formula $(CH_3)_{4-n}SiCl_n$, wherein n is chosen from 1 to 4.

The at least one alkylaluminum alkoxide may be chosen, for example, from modified alkylaluminum alkoxides, which are aliphatic hydrocarbon-soluble, relatively stable and inexpensive, wherein the alkyl group of the at least one alkylaluminum alkoxide can be chosen, for example, from linear and branched $C_1$-$C_{20}$ alkyl groups. In one embodiment, the modified alkylaluminum alkoxides manufactured by Akzo Nobel Co. (MMAO-AAA) is used.

The at least one conjugated double bond-containing organic compound can be chosen, for example, diolefins, such as butadiene and isoprene.

The mixing ratios of the catalyst components are not specifically limited. For example, the molar ratio of the component (b) to the component (a) and the molar ratio of the component (d) to the component (a) can be determined depending upon the desired molecular weight and molecular weight distribution.

For example, the molar ratio of the component (b) to the component (a) in the catalyst system as disclosed herein can range from 5:1 to 100:1. The molar ratio of the component (c) to the component (a) in the catalyst system as disclosed herein can range, for example, from 0.5:1 to 10:1. The molar ratio of the component (d), if present, to the component (a) in the catalyst system as disclosed herein can range, for example, from 0.1:1 to 100:1. The molar ratio of the component (e) to the component (a) in the catalyst system as disclosed herein can range, for example, from 5:1 to 30:1.

The catalyst system as disclosed herein can be prepared by, for example, mixing the catalyst components according to a feeding order of (a)+(e)+(b)+(d)+(c) or (a)+(e)+(b)+(c) →(d) and aging the mixture of the catalyst components (a), (e), (b) and optionally (d) in, for example, a water bath at a temperature of over 30° C. for 10 minutes before adding the catalyst component (c) or aging the mixture of the catalyst components (a), (e), and (b) in, for example, a water bath at a temperature of over 30° C. for 10 minutes before adding the catalyst component (c) and optionally the catalyst component (d). The resulting catalyst system is colored and homogeneous. In one embodiment, when the catalyst component (b) is $AlH(i-Bu)_2$, the resulting catalyst system is a grass green homogeneous solution. In another embodiment, when the catalyst component is chosen from $AlEt_3$ and $Al(i-Bu)_3$, the resulting catalyst system is a brown homogeneous solution.

The weight-average molecular weight (Mw), number-average molecular weight (Mn) and molecular weight distribution (Mw/Mn) of the resulting cis-1,4-polybutadiene rubber prepared using the method disclosed herein are determined by SHIMATSU LL-4A Model gel permeation chromatography using THF as solvent at 30° C.

The weight-average molecular weight of the resulting cis-1,4-polybutadiene rubber may range, for example, from 100,000 to 5,000,000. In addition, the molecular weight contribution of the resulting cis-1,4-polybutadiene rubber using the method as disclosed herein is controlled, for example, within the range from 1.5 to 3.

The polymerization according to the present disclosure may be chosen, for example, from homopolymerizations and copolymerizations, solution polymerization and bulk polymerization, optionally in the presence of at least one hydrocarbon diluent chosen, for example, from alkanes, such as hexane. The polymerization temperature may range, for example, from 10° C. to 150° C.

The method as disclosed herein can be suitable for manufacturing a homopolymer or copolymer rubber with a high yield of the cis-structure and a molecular weight distribution of 1.5-3.0. The resulting rubbers include, for example, cis-1,4-polybutadiene rubber, oil-extended cis-1,4-polybutadiene rubber, polyisoprene rubber and butylene-amylene copolymer rubber.

The rubbers prepared according to the methods disclosed herein can be used to manufacture various products, for example, treads, side wall and body of an automobile tire. Needless to say, the rubber can also be used for other rubber products and for plastic strengthening.

Other than in the operating examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The present invention can be more clearly understood from the following examples, which are given merely for illustration and are not intended to limit this invention.

EXAMPLE 1

0.21 ml (0.045 mmol) of neodymium neodecanoate, 0.23 ml (0.453 mmol) of butadiene in hexane solution, 0.49 ml (1.38 mmol) of AlH(i-Bu)$_2$, 0.097 ml (0.231 mmol) of MMAO (Akzo Nobel Co., MMAO-AAA) were successively added into a baked, deoxygenated and dried 10 ml single-neck flask. The mixture was aged in a water bath at 50° C. for 10 minutes, and then 0.58 ml (0.116 mmol) of Al(i-Bu)$_2$Cl was added. The catalyst was obtained, which was a transparent green homogeneous solution.

84 ml of hexane and 10 g of butadiene first, and then 0.16 ml of the catalyst were added into a baked (under N$_2$), vacuum dried 120 ml single-neck flask. The polymerization was carried in the sealed flask in a water bath at 50° C. for 4 hours. A solution of 2,6,4-antioxidant in ethanol was added to terminate the reaction and to precipitate the resulting polymer. After separation and vacuum drying, the sample was obtained.

The viscosity-average molecular weight (Mη), weight-average molecular weight (Mw), number-average molecular weight (Mn) and molecular weight distribution (Mw/Mn) of the sample were determined by SHIMATSU LL-4A Model gel permeation chromatography using THF as solvent at 30° C. The conversion and the contents of cis-1,4-polybutadiene and 1,2-polybutadiene in the sample were determined by common methods known to one of ordinary skill in the art. The test result is shown in Table 1.

EXAMPLES 2-3

The same preparation of the catalyst, polymerization and test were carried out as in Example 1, except that the amounts of AlH(i-Bu)$_2$ and MMAO were changed as indicated in Table 1. The test results are shown in Table 1.

EXAMPLE 4

The same preparation of the catalyst, polymerization and test were carried out as in Example I, except that the amount of AlH(i-Bu)$_2$ was increased and no MMAO was added as indicated in Table 1. The result is shown in Table 1.

TABLE 1

| Example No. | AlH (i-Bu)$_2$ (ml) | MMAO (ml) | Conversion % | Cis-1,4-% | 1,2-% | Mη × 10$^4$ | Mw × 10$^4$ | Mn × 10$^4$ | Mw/Mn |
|---|---|---|---|---|---|---|---|---|---|
| 1 | 0.49 | 0.097 | 98 | 97.3 | 0.4 | 31.6 | 30.9 | 17.6 | 1.78 |
| 2 | 0.41 | 0.19 | 98 | 97.0 | 0.4 | 35.2 | 35.6 | 18.5 | 1.92 |
| 3 | 0.33 | 0.29 | 98 | 98.5 | 0.4 | 41.2 | 40.5 | 22.0 | 1.85 |
| 4 | 0.58 | — | 100 | 97.4 | 0.4 | 35.4 | 37.3 | 15.6 | 2.39 |

COMPARATIVE EXAMPLE 1

0.32 ml (0.056 mmol) of neodymium neodecanoate and 0.40 ml (2.244 mmol) of AlH(i-Bu)$_2$ were successively added into a baked, deoxygenated and dried 10 ml single-neck flask. The mixture was aged in a water bath at 50° C. for 10 minutes, and then 0.69 ml (0.138 mmol) of Al(i-Bu)$_2$Cl was added. The catalyst was obtained, which was homogeneous.

84 ml of hexane and 10 g of butadiene first, and then 0.14 ml of the catalyst were added into a baked (under N$_2$), vacuum dried 120 ml single-neck flask. The polymerization was carried in the sealed flask in a water bath at 50° C. for 4 hours. A solution of 2,6,4-antioxidant in ethanol was added to terminate the reaction and to precipitate the resulting polymer. After separation and vacuum drying, 9.8 g of dry rubber was obtained.

The weight-average molecular weight (Mw), number-average molecular weight (Mn) and molecular weight distribution (Mw/Mn) of the sample were determined by SHIMATSU LL-4A Model gel permeation chromatography using THF as solvent at 30° C. The intrinsic viscosity of the sample was determined using Ubbelodhe viscosimeter.

Intrinsic viscosity [η]=3.15 dl/g. Mw=42.1×10$^4$, Mn=10.3×10$^4$, Mw/Mn=4.10.

COMPARATIVE EXAMPLE 2

The same preparation of the catalyst, polymerization and test were carried out as in Comparative Example 1, except that the amount of AlH(i-Bu)$_2$ was decreased to 0.20 ml (1.122 mmol), 0.46 ml (1.09 mmol) of MMAO was added, and 0.17 ml of the prepared catalyst (which was a heterogeneous turbid solution) was added into the flask containing butadiene and hexane. 9.6 g of dry rubber was obtained. Intrinsic viscosity [η]=3.55 dl/g. Mw=58.0×10$^4$, Mn=17.5×10$^4$, Mw/Mn=3.32.

COMPARATIVE EXAMPLE 3

The same preparation of the catalyst, polymerization and test were carried out as in Comparative Example 1, except that the feeding order of the catalyst components was changed, i.e., AlH(i-Bu)$_2$ and Al(i-Bu)$_2$Cl were added first, and then neodymium neodecanoate was added after the aging. The resulting catalyst was heterogeneous. 9.8 g of dry rubber was obtained. Intrinsic viscosity [η]=4.92 dl/g. Mw=69.2×10$^4$, Mn=8.9×10$^4$, Mw/Mn=7.75.

COMPARATIVE EXAMPLE 4

The same preparation of the catalyst, polymerization and test were carried out as in Comparative Example 2, except that the feeding order of the catalyst components was the same as in Comparative Example 3. 9.4 g of dry rubber was obtained. Intrinsic viscosity [η]=3.24 dl/g. Mw=46.5×10$^4$, Mn=15.2×10$^4$, Mw/Mn=3.07.

EXAMPLE 5

0.32 ml (0.056 mmol) of neodymium neodecanoate, 0.23 ml (0.453 mmol) of butadiene, 0.40 ml (2.244 mmol) of AlH(i-Bu)$_2$ were successively added into a baked, deoxygenated, dried 10 ml single-neck flask. The mixture was aged in a water bath at 50° C. for 10 minutes, and then 0.69 ml (0.138 mmol) of Al(i-Bu)$_2$Cl was added. The catalyst was obtained, which was a homogeneous green solution.

84 ml of dry hexane, 10 g of butadiene, and then 0.16 ml of the catalyst were added into a baked (under N$_2$), vacuum dried 120 ml single-neck flask. The polymerization was carried in the sealed flask in a water bath at 50° C. for 4 hours. A solution of 2,6,4-antioxidant in ethanol was added to terminate the reaction and to precipitate the resulting polymer. After separation and vacuum drying, 9.3 g of dry rubber was obtained. The same test as in Comparative Example 1 was carried out. Intrinsic viscosity [η]=2.36 dl/g. Mw=31.1×10$^4$, Mn=10.8×10$^4$, Mw/Mn=2.88.

EXAMPLE 6

The same preparation of the catalyst, polymerization and test were carried out as in Example 5, except that the amount of AlH(i-Bu)$_2$ was decreased to 0.20 ml (1.122 mmol), 0.46 ml (1.09 mmol) of MMAO was added, and 0.21 ml of the catalyst was added into the polymerization flask. 9.8 g of dry rubber was obtained. Intrinsic viscosity [η]=3.52 dl/g. Mw=53.6×10$^4$, Mn=24.9×10$^4$, Mw/Mn=2.15.

EXAMPLE 7

The same preparation of the catalyst, polymerization and test were carried out as in Example 6, except that MMAO was separately added and was not involved in the aging. 9.8 g of dry rubber was obtained. Intrinsic viscosity [η]=2.98 dl/g. Mw=42.4×10$^4$, Mn=18.6×10$^4$, Mw/Mn=2.28.

EXAMPLE 8

0.38 ml (0.0842 mmol) of neodymium naphthenate, 0.42 ml (0.45 mmol) of butadiene in hexane solution, 0.59 ml (1.658 mmol) of AlH(i-Bu)$_2$, 0.7 ml (1.666 mmol) of MMAO were successively added into a baked, deoxygenated, dried 10 ml single-neck flask. The mixture was aged in a water bath at 50° C. for 10 minutes, and then 1.04 ml (0.208 mmol) of Al(i-Bu)$_2$Cl was added.

84 ml of dry hexane, 10 g of butadiene, and then 0.21 ml of the prepared catalyst were added into a baked (under N$_2$), vacuum dried 120 ml single-neck flask. The polymerization was carried in the sealed flask in a water bath at 50° C. for 4 hours. A solution of 2,6,4-antioxidant in ethanol was added to terminate the reaction and to precipitate the resulting polymer. After separation and vacuum drying, 9.4 g of dry rubber was obtained.

The same test was carried out as in Example 1 and Comparative Example 1. Intrinsic viscosity [η]=3.63 dl/g, the content of cis-1,4-polybutadiene =97.7%, the content of 1,2-polybutadiene =0.5%. Mw=54.9×10$^4$, Mn=31.3×10$^4$, Mw/Mn=2.58.

EXAMPLE 9

The same preparation of the catalyst, polymerization, and test were carried out as in Example 8, except that the feeding order of the catalyst components was changed, i.e., neodymium naphthenate, butadiene in hexane solution, and AlH(i-Bu)$_2$ were successively added first, then after the ageing Al(i-Bu)$_2$Cl was added, and 0.16 ml of MMAO was separately added. 9.3 g of dry rubber was obtained. Intrinsic viscosity [η]=3.04 dl/g. The content of cis-1,4-polybutadiene =97.2%, the content of 1,2-polybutadiene=0.4%. Mw=44.3×10$^4$, Mn=20.4×10$^4$, Mw/Mn=2.17.

EXAMPLES 10-13

The same preparation and polymerization were carried as in Example 8, except that the amounts of butadiene, neodymium neodecanoate and Al(i-Bu)$_2$Cl were 0.185 mol, 0.00093 mmol, 0.0023 mmol, respectively, and the amounts of AlH(i-Bu)$_2$ and MMAO were indicated in Table 2. The conversion and the intrinsic viscosity were determined as discussed above. The test results are shown in Table 2.

TABLE 2

| Example No. | AlH(i-Bu)$_2$ (mol) | MMAO (mol) | Conversion % | [η] dl/g |
|---|---|---|---|---|
| 10 | 0.046 | 0 | 15 | 5.99 |
| 11 | 0.037 | 0.916 × 10$^{-4}$ | 36 | 7.40 |
| 12 | 0.028 | 1.845 × 10$^{-4}$ | 57 | 8.06 |
| 13 | 0.019 | 2.773 × 10$^{-4}$ | 90 | 7.44 |

EXAMPLE 14

0.21 ml (0.04679 mmol) of neodymium neodecanoate, 0.23 ml (0.468 mmol) of butadiene in hexane solution, 0.75 ml (1.403 mmol) of AlH(i-Bu)$_2$, 0.23 ml (0.23 mmol) of MAO were added into a baked, deoxygenated, dried 10 ml single-neck flask. The mixture was aged in a water bath at 50° C. for 10 minutes, and then 0.58 ml (0.116 mmol) of Al(i-Bu)$_2$Cl was added. Aging was further carried out for 10 minutes.

84 ml of dry hexane, 10 g of butadiene, and then 0.21 ml of the prepared catalyst were added into a baked (under N$_2$), vacuum dried 120 ml single-neck flask. The polymerization was carried in the sealed flask in a water bath at 50° C. for 4 hours. A solution of 2,6,4-antioxidant in ethanol was added to terminate the reaction and to precipitate the resulting polymer. After separation and vacuum drying, 9.2 g of dry rubber was obtained. The Intrinsic viscosity and Mw, Mn, and Mw/Mn were determined as discussed above. Intrinsic viscosity [η]=2.92 dl/g. Mw=41.9×10$^4$, Mn=18.9×10$^4$, Mw/Mn=2.20.

EXAMPLE 15

The same preparation, polymerization, and test were carried out as in Example 14, except that 0.50 ml (0.935 mmol) of AlH(i-Bu)$_2$, 0.69 ml (0.69 mmol) of MMAO, and 0.22 ml of the prepared catalyst were added into the polymerization flask respectively. 9.0 g of dry rubber was obtained. Intrinsic viscosity [η]=6.09 dl/g. Mw=103×10$^4$, Mn=49.3×10$^4$, Mw/Mn=2.09.

EXAMPLE 16

0.27 ml (0.0600 mmol) of neodymium neodecanoate, 0.3 ml (0.6 mmol) of butadiene-hexane solution and 1.13 ml (2.113 mmol) of AlH(i-Bu)$_2$ were added into a baked, deoxygenated, dried 10 ml single-neck flask. The mixture was aged in a water bath at 50° C. for 10 minutes, and then 0.58 ml (0.116 mmol) of Al(i-Bu)$_2$Cl was added. Aging was further carried out for 10 minutes.

84 ml of dry hexane, 10 g of butadiene, and then 0.245 ml of the prepared catalyst were added into a baked (under N$_2$), vacuum dried 120 ml single-neck flask. The polymerization was carried in the sealed flask in a water bath at 50° C. for 4 hours. A solution of 2,6,4-antioxidant in ethanol was added to terminate the reaction and to precipitate the resulting polymer. After separation and vacuum drying, 9 g of dry rubber was obtained. The Intrinsic viscosity and Mw, Mn, and Mw/Mn were determined as discussed above. Intrinsic viscosity [η]=2.80 dl/g. Mw =36.4×10$^4$, Mn =14.6×10$^4$, Mw/Mn =2.49.

It will be parent to persons of ordinary skill in the art that various modifications and variations of the invention may be made, without departing from the scope of the invention as claimed. Thus, it is intended that this disclosure covers the variations and permeation of the invention.

What is claimed is:

1. A method for preparing a cis-1,4-polybutadiene rubber with a controlled molecular weight distribution, comprising polymerizing butadiene monomer using a rare-earth catalyst system comprising:
   (a) at least one aliphatic hydrocarbon-soluble organometallic compound comprising at least one metal element selected from the group consisting of the elements of atomic numbers 51-71 in the periodic table;
   (b) at least one organoaluminum compound of the formula: AlR$^1$R$^2$$_2$, wherein R$^1$ and two R$^2$ groups, which may be identical or different, are each selected from the groups consisting of alkyl groups, or when R$^1$ is H, two R$^2$ groups are the same and selected from the group consisting of alkyl groups;
   (c) at least one aliphatic hydrocarbon-soluble halogen-containing compound selected from the group consisting of metal haloalkyl compounds, metal halides, and haloalkyl compounds;
   (d) at least one alkylaluminum alkoxide; and
   (e) at least one conjugated double bond-containing organic compound, further comprising premixing the catalyst components according to a feeding order of (a)+(e)+(b)+(d)+(c) or (a)+(e)+(b)+(c)→(d) and aging the mixture of the catalyst components (a), (e), (b) and (d) before adding the catalyst component (c) or aging the mixture of the catalyst components (a), (e), and (b) before adding the catalyst component (c) and the catalyst component (d), wherein the aging temperature is above 30° C.

2. The process according to claim 1, wherein the at least one aliphatic hydrocarbon-soluble organometallic compound is selected from the group consisting of carboxylates and complexes of at least one metal element selected from the group consisting of the elements of atomic numbers 57-71 in the periodic table.

3. The process according to claim 2, wherein the at least one metal element is selected from the group consisting of Nd and Pr.

4. The process according to claim 2, wherein the at least one aliphatic hydrocarbon-soluble organometallic compound is selected from the group consisting of neodymium neodecanoate and neodymium naphthenate.

5. The process according to claim 1, wherein, in (b) defining the at least one organoaluminum compound, the alkyl groups are selected from the group consisting of C$_1$-C$_{20}$ linear and branched alkyl groups.

6. The process according to claim 5, wherein the at least one organoaluminum compound is selected from the group consisting of triisobutylaluminum (Al(i-Bu)$_3$), triethylaluminum (AlEt$_3$), and diisobutylaluminum hydride (AlH(i-Bu)$_2$).

7. The process according to claim 1, wherein the at least one aliphatic hydrocarbon-soluble halogen-containing compound is selected from the group consisting of haloalkanes, haloalkylaluminum and halosilanes.

8. The process according to claim 7, wherein the at least one aliphatic hydrocarbon-soluble halogen-containing compound is selected from the group consisting of t-butyl chloride (t-BuCl), alkylaluminum sesquichlorides of formula Al$_2$R$_3$Cl$_3$, monochlorodialkylaluminum of formula AlR$_2$Cl, wherein R is selected from the group consisting of linear and branched C$_1$-C$_{20}$ alkyl groups, and methyl chlorosilanes of formula (CH$_3$)$_{4-n}$SiCl$_n$, wherein n is selected from the group consisting of 1 to 4.

9. The process according to claim 8, wherein R is selected from the group consisting of ethyl and isobutyl groups.

10. The process according to claim 1, wherein the at least one alkylaluminum alkoxide is selected from the group consisting of modified alkylaluminum alkoxides.

11. The process according to claim 1, wherein the alkyl group of the at least one alkylaluminum alkoxide is selected from the group consisting of linear and branched C$_1$-C$_{20}$ alkyl groups.

12. The process according to claim 1, wherein the at least one conjugated double bond-containing organic compound is selected from the group consisting of butadiene and isoprene.

13. The process according to claim 1, wherein the molar ratio of the component (b) to the component (a) in the catalyst system ranges from 5:1 to 100:1.

14. The process according to claim 1, wherein the molar ratio of the component (c) to the component (a) in the catalyst system ranges from 0.5:1 to 10:1.

15. The process according to claim 1, wherein the molar ratio of the component (d) to the component (a) in the catalyst system ranges from 0.1:1 to 100:1.

16. The process according to claim 1, wherein the molar ratio of the component (e) to the component (a) in the catalyst system ranges from 5:1 to 30:1.

17. The process according to claim 1, wherein the component (b) is AlH(i-Bu)$_2$ and the catalyst system is a grass green homogeneous solution.

18. The process according to claim 1, wherein the component (b) is selected from the group consisting of AlEt$_3$ and Al(i-Bu)$_3$ and the catalyst system is a brown homogeneous solution.

19. The process according to claim 1, wherein the weight-average molecular weight of the cis-1,4-polybutadiene rubber ranges from 100,000 to 5,000,000.

20. The process according to claim 1, wherein the molecular weight distribution of the cis-1,4-polybutadiene rubber ranges from 1.5 to 3.

21. The process according to claim 1, wherein the polymerization is selected from the group consisting of solution polymerizations and bulk polymerizations, optionally in the presence of at least one hydrocarbon diluent.

22. The process according to claim 1, wherein the polymerization temperature ranges from 10° C. to 150 ° C.

23. A method for preparing a rare-earth catalyst system, comprising
mixing the following components:
(a) at least one aliphatic hydrocarbon-soluble organometallic compound comprising at least one metal element selected from the group consisting of the elements of atomic numbers 57-71 in the periodic table;
(e) at least one conjugated double bond-containing organic compound; and
(b) at least one organoaluminum compound of the formula: $AlR^1R^2_2$, wherein $R^1$ and two $R^2$ groups, which may be identical or different, are each selected from the group consisting of alkyl groups, or when $R^1$ is H, two $R^2$ groups are the same and selected from the group consisting of alkyl groups; and
(d) at least one alkylaluminum alkoxide; aging the mixture at a temperature of over 30° C.; and adding into the aged mixture
(c) at least one aliphatic hydrocarbon-soluble halogen-containing compound selected from the group consisting of metal haloalkyl compounds, metal halides, and haloalkyl compounds.

24. A method for preparing a rare-earth catalyst system, comprising
mixing the following components:
at least one aliphatic hydrocarbon-soluble organometallic compound comprising at least one metal element selected from the group consisting of the elements of atomic numbers 57-71 in the periodic table;
(e) at least one conjugated double bond-containing organic compound; and
(b) at least one organoaluminum compound of the formula: $AlR^1R^2_2$, wherein $R^1$ and two $R^2$ groups, which may be identical or different, are each selected from the group consisting of alkyl groups, or when $R^1$ is H, two $R^2$ groups are the same and selected from the group consisting of alkyl groups;
aging the mixture at a temperature of over 30° C.; and adding into the aged mixture
(c) at least one aliphatic hydrocarbon-soluble halogen-containing compound selected from the group consisting of metal haloalkyl compounds, metal halides, and haloalkyl compounds; and
(d) at least one alkylaluminum alkoxide.

25. A method for preparing a polydiene rubber with a controlled molecular weight distribution, comprising polymerizing at least one diene monomer using a rare-earth catalyst system comprising:
(a) at least one aliphatic hydrocarbon-soluble organometallic compound comprising at least one metal element selected from the group consisting of the elements of atomic numbers 57-71 in the periodic table;
(b) at least one organoaluminum compound of the formula: $AlR^1R^2_2$, wherein $R^1$ and two $R^2$ groups, which may be identical or different, are each selected from the group consisting of alkyl groups, or when R1 is H, two R2 groups are the same and selected from the group consisting of alkyl groups;
(c) at least one aliphatic hydrocarbon-soluble halogen-containing compound selected from the group consisting of metal haloalkyl compounds, metal halides, and haloalkyl compounds;
(d) at least one alkylaluminum alkoxide; and
(e) at least one conjugated double bond-containing organic compound, further comprising premixing the catalyst components according to a feeding order of (a)+(e)+(b)+(d)+(c) or (a)+(e)+(b)+(c)→(d) and aging the mixture of the catalyst components (a), (e), (b) and (d) before adding the catalyst component (c) or aging the mixture of the catalyst components (a), (e), and (b) before adding the catalyst component (c) and the catalyst component (d), wherein the aging temperature is above 30° C.

26. The method according to claim 25, wherein the polydiene rubber is selected from the group consisting of homopolymers and copolymers.

* * * * *